(12) United States Patent
Komai et al.

(10) Patent No.: US 10,590,933 B2
(45) Date of Patent: Mar. 17, 2020

(54) ROTARY COMPRESSOR

(71) Applicant: FUJITSU GENERAL LIMITED, Kawasaki-shi, Kanagawa (JP)

(72) Inventors: Yuji Komai, Kanagawa (JP); Masayuki Onomura, Kanagawa (JP); Tetsuo Fukuda, Kanagawa (JP); Naoya Morozumi, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 155 days.

(21) Appl. No.: 15/466,863

(22) Filed: Mar. 23, 2017

(65) Prior Publication Data

US 2017/0276135 A1 Sep. 28, 2017

(30) Foreign Application Priority Data

Mar. 28, 2016 (JP) ................... 2016-063879

(51) Int. Cl.
  *F04C 23/00* (2006.01)
  *H02K 15/02* (2006.01)
  *F04C 18/356* (2006.01)

(52) U.S. Cl.
  CPC .......... *F04C 23/008* (2013.01); *F04C 18/356* (2013.01); *H02K 15/028* (2013.01);
  (Continued)

(58) Field of Classification Search
  CPC ............... F04C 18/356; F04C 23/008; F04C 2230/604; F04C 2230/231; F04C 2240/30;
  (Continued)

(56) References Cited

U.S. PATENT DOCUMENTS 2,593,857 A * 4/1952 De Windt .............. H02K 1/185
                                                29/596
5,168,662 A * 12/1992 Nakamura ............... H02K 1/04
                                                174/DIG. 20
(Continued)

FOREIGN PATENT DOCUMENTS

CN  104141608 A   11/2014
CN  105090033 A   11/2015
(Continued)

OTHER PUBLICATIONS

Machine Translation of JP 2010011645.*
(Continued)

*Primary Examiner* — Christopher S Bobish
(74) *Attorney, Agent, or Firm* — McDermott Will & Emery LLP

(57) ABSTRACT

A rotary compressor including a cylindrical compressor housing provided with an inlet unit of a refrigerant and a discharging unit of the refrigerant, a compressing unit which is disposed inside the compressor housing and includes a cylinder and a piston for compressing the refrigerant sucked in from the inlet portion, a rotation shaft provided with the piston of the compressing unit, and a motor which includes a cylindrical stator and a rotor that is provided on another end side of the rotation shaft and that rotates inside the stator, and which drives the compressing unit via the rotation shaft, in which an outer circumferential portion of the stator includes a concave portion and is fixed to an inner circumferential portion of the compressor housing in a transition fit state, and in which the compressor housing includes a weld portion which is joined to the concave portion of the stator.

7 Claims, 10 Drawing Sheets

(52) U.S. Cl.
CPC .. *F04C 2230/231* (2013.01); *F04C 2230/604* (2013.01); *F04C 2240/30* (2013.01); *F04C 2240/40* (2013.01)

(58) Field of Classification Search
CPC .... F04C 2240/40; H02K 15/028; H02K 1/12; H02K 1/16; H02K 15/024
USPC ............................................. 417/410.3, 902
See application file for complete search history.

(56) References Cited

U.S. PATENT DOCUMENTS

| | | | | |
|---|---|---|---|---|
| 6,971,860 | B2* | 12/2005 | Gilliam | F04B 39/121 417/423.14 |
| 7,618,242 | B2* | 11/2009 | Higuchi | F04C 18/328 417/410.1 |
| 7,938,630 | B2* | 5/2011 | Koike | F04B 39/0044 310/216.049 |
| 7,967,579 | B2* | 6/2011 | Higuchi | F04C 18/322 310/216.136 |
| 8,221,096 | B2* | 7/2012 | Taniwa | F04C 23/008 310/216.136 |
| 8,569,924 | B2 | 10/2013 | Yasuda et al. | |
| 8,647,086 | B2* | 2/2014 | Higuchi | F04B 39/121 418/30 |
| 9,157,437 | B2 | 10/2015 | Yahaba et al. | |
| 9,929,607 | B2 | 3/2018 | Kataoka et al. | |
| 2010/0135830 | A1 | 6/2010 | Yasuda et al. | |
| 2010/0296950 | A1 | 11/2010 | Kataoka et al. | |
| 2013/0259725 | A1 | 10/2013 | Yahaba et al. | |

FOREIGN PATENT DOCUMENTS

| | | | |
|---|---|---|---|
| EP | 2144347 A1 | 1/2010 | |
| EP | 2644894 A2 | 10/2013 | |
| EP | 3043069 A4 * | 8/2016 | ............ H02K 1/185 |
| JP | 2003-176781 A | 6/2003 | |
| JP | 2006-226242 A | 8/2006 | |
| JP | 2008-278673 A | 11/2008 | |
| JP | 2009-299676 A | 12/2009 | |
| JP | 2010-011645 A | 1/2010 | |
| JP | 2010-11645 A | 1/2010 | |
| JP | 2010-081735 A | 4/2010 | |
| JP | 2010-248991 A | 11/2010 | |
| JP | 2011-102543 A | 5/2011 | |
| JP | 2011-50151 * | 10/2011 | |
| JP | 2013-204464 A | 10/2013 | |
| JP | 5430208 B2 | 2/2014 | |
| JP | WO2015/033488 A1 | 3/2017 | |
| WO | 2013/125382 A1 | 8/2013 | |

OTHER PUBLICATIONS

Machine Translation of JP 2011-50151.*
Extended European Search Report issued in corresponding EP Patent Application No. 17163070.0, dated Jul. 14, 2017.
European Office Action dated Jan. 31, 2018 issued in European Patent Application No. 17163070.0.
Office Action issued in corresponding Chinese Patent Application No. 201710187555.5, dated Jul. 4, 2019.
Notice of Reasons for Refusal issued in corresponding Japanese Application No. 2016-063879, dated Nov. 12, 2019, with English translation.

* cited by examiner (A-A)

ROTARY COMPRESSOR

CROSS-REFERENCE TO RELATED APPLICATION

This application is based upon and claims the benefit of priorities from Japanese Patent Application No. 2016-063879 filed on Mar. 28, 2016, the entire contents of which are incorporated herein by reference.

FIELD

The present disclosure relates to a rotary compressor.

BACKGROUND

A rotary compressor is known in which a stator of a motor is fixed inside a compressor housing in an interference fit state, for example, or alternatively, the compressor housing and the stator are joined by spot welding in a clearance fit state. For the rotary compressor of the related art, there is a configuration in which an inner circumferential surface of the compressor housing and an outer circumferential surface of the stator are spot welded via a through hole or a blind hole (a non-penetrating hole) which is formed in an outer circumferential portion of the compressor housing in order to appropriately form a weld portion which joins the compressor housing to the stator.

Japanese Laid-open Patent Publication No. 2006-226242 and Japanese Patent No. 5430208 are examples of the related art.

However, in the rotary compressor of the related art described above, in a case in which a through hole is formed in the compressor housing, a molten metal may not sufficiently fill the through hole, and there is a concern that the welding state between the compressor housing and the stator will be unstable. In a case in which a blind hole is formed in the outer circumferential portion of the compressor housing, due to the edge angle or the like of the tip of a drilling tool such as a drill which machines the blind hole, the bottom of the blind hole becomes a cone shape of approximately 120°, for example, instead of a planar surface. Therefore, since inconsistency arises easily in the contact position between the tip of a welding wire and the bottom of the blind hole during welding, and the welding conditions become unstable, there is a problem in that the stability of the welding state of the weld portion between the compressor housing and the stator is poor.

SUMMARY

The present disclosure is made in consideration of the problem described above, and an object thereof is to provide a rotary compressor capable of increasing the reliability of the welding state of a weld portion between a compressor housing and a stator.

An aspect of a rotary compressor disclosed in the present disclosure includes a cylindrical compressor housing which is provided with an inlet unit of a refrigerant and a discharging unit of the refrigerant, a compressing unit which is disposed inside the compressor housing and which includes a cylinder and a piston for compressing the refrigerant that is sucked in from the inlet portion, a rotation shaft which is provided with the piston of the compressing unit, a bearing unit which is fixed to an inner portion of the compressor housing and which supports one end side of the rotation shaft to rotate freely, and a motor which includes a cylindrical stator and a rotor that is provided on another end side of the rotation shaft and that rotates inside the stator, and which drives the compressing unit via the rotation shaft, in which an outer circumferential portion of the stator includes a concave portion and is fixed to an inner circumferential portion of the compressor housing in a transition fit state, and in which the compressor housing includes a weld portion which is joined to the concave portion of the stator.

The rotary compressor according to the present disclosure is capable of increasing the reliability of the welding state of the weld portion between the compressor housing and the stator.

DESCRIPTION OF EMBODIMENTS

Hereafter, detailed description will be given of the example of the rotary compressor disclosed in the present disclosure with reference to the drawings. The rotary compressor disclosed in the present disclosure is not limited by the following example.

Example

Configuration of Rotary Compressor

Figure 1:
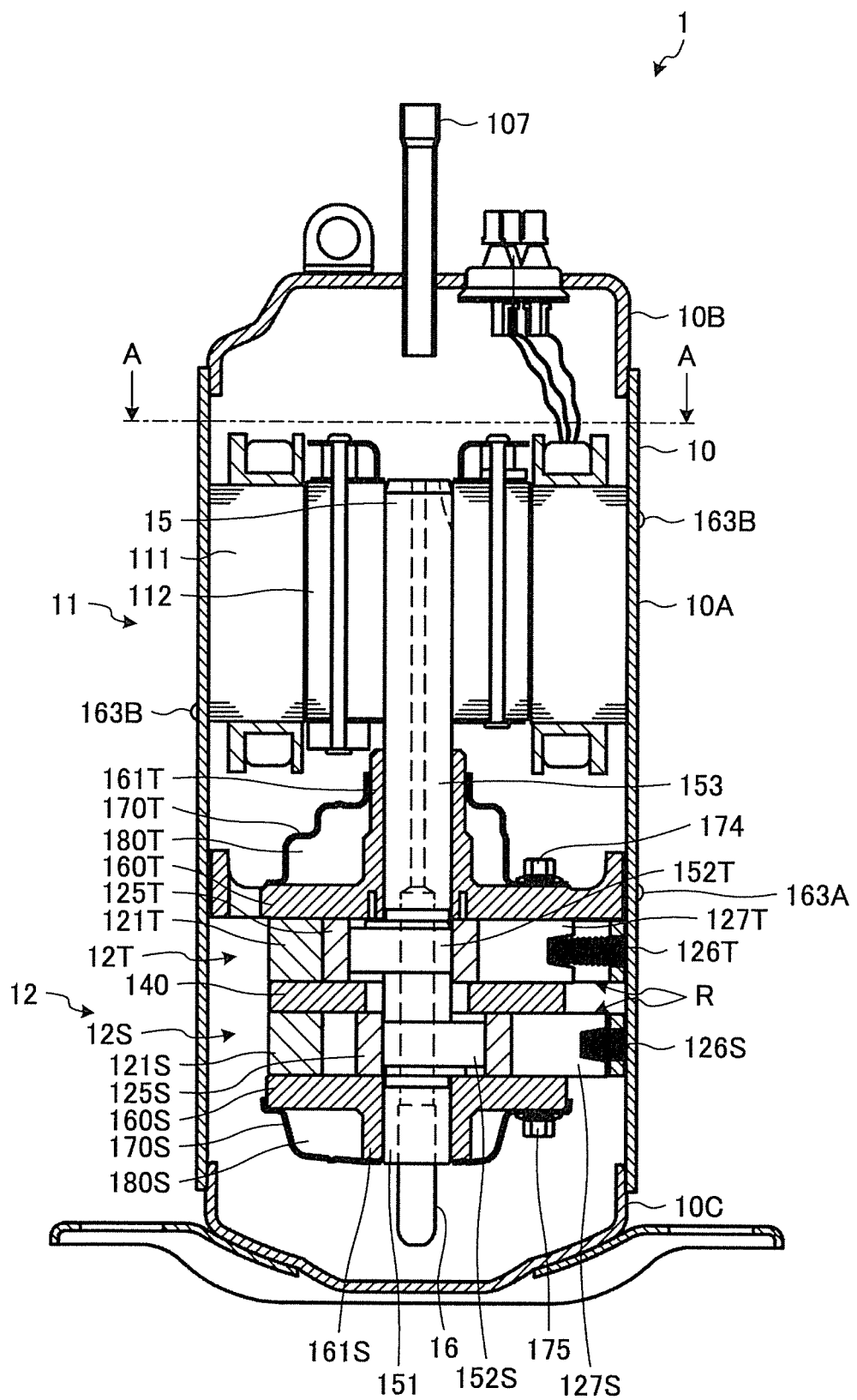
FIG. 1 is a vertical sectional view illustrating a rotary compressor of an example.
Figure 2:
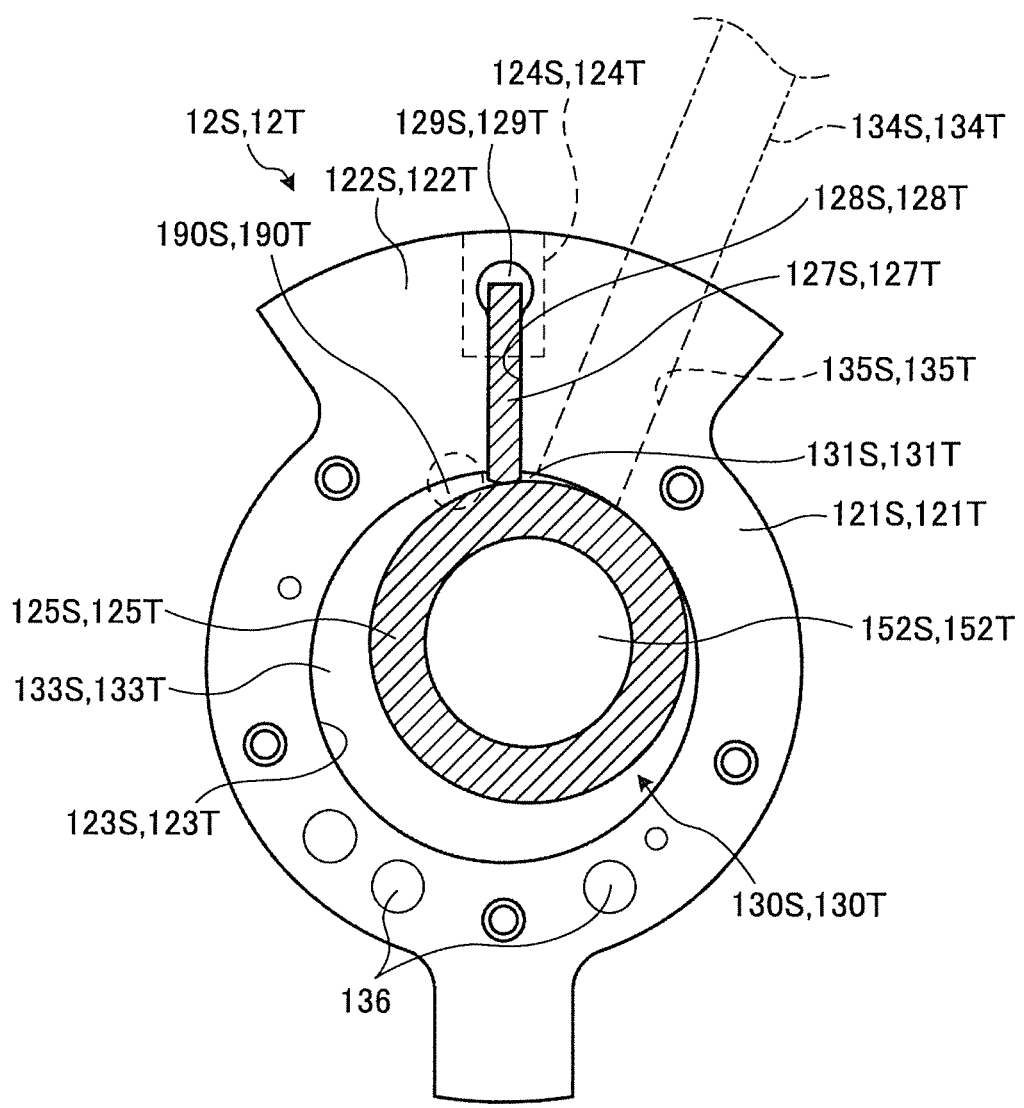
FIG. 2 is a horizontal sectional view illustrating a compressing unit of the rotary compressor of the example.

FIG. 1 is a vertical sectional view illustrating an example of a rotary compressor according to the present disclosure. FIG. 2 is a horizontal sectional view illustrating a compressing unit of the rotary compressor of the example.

As illustrated in FIG. 1, a rotary compressor 1 is provided with a compressing unit 12, and a motor 11. The compressing unit 12 is disposed on the bottom portion of a sealed vertically-placed cylindrical compressor housing 10, and the motor 11 is disposed above the compressor housing 10 and drives the compressing unit 12 via a rotation shaft 15.

A stator 111 of the motor 11 is formed in a cylindrical shape, and is fixed to the inner circumferential surface of a body unit 10A of the compressor housing 10 by gas shielded arc spot welding (hereinafter referred to as arc welding). Description will be given later of the characteristic configuration of the rotary compressor 1 of the present disclosure, which is the welding state between the body unit 10A of the compressor housing 10 and the stator 111, and the assembly method. A rotor 112 is disposed in the inner portion of the cylindrical stator 111, and is shrink fitted to be fixed to the rotation shaft 15 which mechanically connects the motor 11 to the compressing unit 12.

The compressing unit 12 is provided with a first compressing unit 12S and a second compressing unit 12T. The second compressing unit 12T is disposed on the top side of the first compressing unit 12S. As illustrated in FIG. 2, the first compressing unit 12S is provided with an annular first cylinder 121S. The first cylinder 121S is provided with a first side-flared portion 122S which overhangs from the outer circumference of the ring shape. A first inlet hole 135S and a first vane groove 128S are provided radially on the first side-flared portion 122S. The second compressing unit 12T is provided with an annular second cylinder 121T. The second cylinder 121T is provided with a second side-flared portion 122T which overhangs from the outer circumference of the ring shape. A second inlet hole 135T and a second vane groove 128T are provided radially on the second side-flared portion 122T.

As illustrated in FIG. 2, a circular first cylinder inner wall 123S is formed in the first cylinder 121S coaxially with the rotation shaft 15 of the motor 11. A first annular piston 125S which has a smaller outer diameter than the inner diameter of the first cylinder 121S is disposed inside the first cylinder inner wall 123S, and a first cylinder chamber 130S which sucks in, compresses, and discharges a refrigerant is formed between the first cylinder inner wall 123S and the first annular piston 125S. A circular second cylinder inner wall 123T is formed in the second cylinder 121T coaxially with the rotation shaft 15 of the motor 11. A second annular piston 125T which has a smaller outer diameter than the inner diameter of the second cylinder 121T is disposed inside the second cylinder inner wall 123T. A second cylinder chamber 130T which sucks in, compresses, and discharges a refrigerant is formed between the second cylinder inner wall 123T and the second annular piston 125T.

The first vane groove 128S is formed along the entire vertical area of the cylinder in the radial direction from the first cylinder inner wall 123S of the first cylinder 121S. A flat plate shaped first vane 127S is slidably fitted inside the first vane groove 128S. The second vane groove 128T is formed along the entire vertical area of the cylinder in the radial direction from the second cylinder inner wall 123T of the second cylinder 121T. A flat plate shaped second vane 127T is slidably fitted inside the second vane groove 128T.

As illustrated in FIG. 2, a first spring hole 124S is formed on the outside in the radial direction of the first vane groove 128S so as to communicate from the outer circumferential portion of the first side-flared portion 122S to the first vane groove 128S. A first vane spring 126S (refer to FIG. 1) which presses against the rear surface of the first vane 127S is inserted into the first spring hole 124S. A second spring hole 124T is formed on the outside in the radial direction of the second vane groove 128T so as to communicate from the outer circumferential portion of the second side-flared portion 122T to the second vane groove 128T. A second vane spring 126T (refer to FIG. 1) which presses against the rear surface of the second vane 127T is inserted into the second spring hole 124T.

During the starting of the rotary compressor 1, due to the repulsive force of the first vane spring 126S, the first vane 127S protrudes from inside the first vane groove 128S into the first cylinder chamber 130S, and the tip of the first vane 127S comes into contact with the outer circumferential surface of the first annular piston 125S. As a result, the first cylinder chamber 130S is partitioned into a first inlet chamber 131S and a first compression chamber 133S by the first vane 127S. In the same manner, due to the repulsive force of the second vane spring 126T, the second vane 127T protrudes from inside the second vane groove 128T into the second cylinder chamber 130T, and the tip of the second vane 127T comes into contact with the outer circumferential surface of the second annular piston 125T. As a result, the second cylinder chamber 130T is partitioned into a second inlet chamber 131T and a second compression chamber 133T by the second vane 127T.

In the first cylinder 121S, the outside in the radial direction of the first vane groove 128S is caused to communicate with the inside of the compressor housing 10 using an opening portion R (refer to FIG. 1), and a compressed refrigerant inside the compressor housing 10 is guided into the first cylinder 121S. At this time, a first pressure guiding-in path 129S is formed which applies a back pressure to the first vane 127S through the pressure of the refrigerant. The compressed refrigerant inside the compressor housing 10 is also guided in from the first spring hole 124S. In the second cylinder 121T, the outside in the radial direction of the second vane groove 128T is caused to communicate with the inside of the compressor housing 10 using the opening portion R (refer to FIG. 1), and the compressed refrigerant inside the compressor housing 10 is guided into the second cylinder 121T. At this time, a second pressure guiding-in path 129T is formed which applies a back pressure to the second vane 127T through the pressure of the refrigerant. The compressed refrigerant inside the compressor housing 10 is also guided in from the second spring hole 124T.

The first inlet hole 135S which causes the first inlet chamber 131S to communicate with an external unit is provided in the first side-flared portion 122S of the first cylinder 121S in order to suck the refrigerant from the external unit into the first inlet chamber 131S. The first inlet hole 135S is linked to an accumulator (not illustrated) via a lower inlet pipe 134S which serves as an inlet unit which is provided in the compressor housing 10. The second inlet hole 135T which causes the second inlet chamber 131T to communicate with an external unit is provided in the second side-flared portion 122T of the second cylinder 121T in order to suck the refrigerant from the external unit into the second inlet chamber 131T. The second inlet hole 135T is linked to the accumulator (not illustrated) via an upper inlet pipe 134T which serves as an inlet unit which is provided in the compressor housing 10. The cross-sections of the first inlet hole 135S and the second inlet hole 135T are circular.

As illustrated in FIG. 1, an intermediate partition plate 140 is disposed between the first cylinder 121S and the second cylinder 121T, and the intermediate partition plate 140 partitions the first cylinder chamber 130S (refer to FIG. 2) of the first cylinder 121S and the second cylinder chamber 130T (refer to FIG. 2) of the second cylinder 121T. The intermediate partition plate 140 blocks the top end portion of the first cylinder 121S and the bottom end portion of the second cylinder 121T.

A lower end plate 160S is disposed on the bottom end portion of the first cylinder 121S, and the lower end plate 160S blocks the first cylinder chamber 130S of the first cylinder 121S. An upper end plate 160T is disposed on the top end portion of the second cylinder 121T, and the upper end plate 160T blocks the second cylinder chamber 130T of the second cylinder 121T. The lower end plate 160S blocks the bottom end portion of the first cylinder 121S, and the upper end plate 160T blocks the top end portion of the second cylinder 121T.

A sub-bearing unit 161S is disposed on the lower end plate 160S, and a sub-shaft unit 151 of the rotation shaft 15 is supported on the sub-bearing unit 161S to rotate freely. A main bearing unit 161T is disposed on the upper end plate 160T, and a main shaft unit 153 of the rotation shaft 15 is supported on the main bearing unit 161T to rotate freely.

The rotation shaft 15 is provided with a first eccentric portion 152S and a second eccentric portion 152T, which are shifted from each other to have an eccentric phase of 180°. The first eccentric portion 152S is fitted into the first annular piston 125S of the first compressing unit 12S to rotate freely, and the second eccentric portion 152T is fitted into the second annular piston 125T of the second compressing unit 12T to rotate freely.

When the rotation shaft 15 rotates, the first annular piston 125S revolves (clockwise from the perspective of FIG. 2) inside the first cylinder 121S along the first cylinder inner wall 123S. The first vane 127S moves reciprocally following the revolution of the rotation shaft 15. The volumes of the first inlet chamber 131S and the first compression chamber 133S change continually, and the compressing unit 12 sucks in, compresses, and discharges the refrigerant continually according to the movement of the first annular piston 125S and the first vane 127S. When the rotation shaft 15 rotates, the second annular piston 125T revolves (clockwise from the perspective of FIG. 2) inside the second cylinder 121T along the second cylinder inner wall 123T. The second vane 127T moves reciprocally following the revolution of the rotation shaft 15. The volumes of the second inlet chamber 131T and the second compression chamber 133T change continually, and the compressing unit 12 sucks in, compresses, and discharges the refrigerant continually according to the movement of the second annular piston 125T and the second vane 127T.

As illustrated in FIG. 1, a lower end plate cover 170S is disposed on the bottom side of the lower end plate 160S, and a lower muffler chamber 180S is formed between the lower end plate cover 170S and the lower end plate 160S. The first compressing unit 12S is opened toward the lower muffler chamber 180S. In other words, a first discharge hole 190S (refer to FIG. 2) which causes the first compression chamber 133S of the first cylinder 121S to communicate with the lower muffler chamber 180S is provided in the vicinity of the first vane 127S of the lower end plate 160S. A reed valve type first discharge valve (not illustrated) which prevents the backflowing of the compressed refrigerant is disposed on the first discharge hole 190S.

The lower muffler chamber 180S is a single chamber formed in a ring shape, and is a portion of a communicating path which causes the discharge side of the first compressing unit 12S to communicate with the inside of an upper muffler chamber 180T through a refrigerant path 136 (refer to FIG. 2) which penetrates the lower end plate 160S, the first cylinder 121S, the intermediate partition plate 140, the second cylinder 121T, and the upper end plate 160T. The lower muffler chamber 180S reduces the pressure pulsation of the discharged refrigerant. A first discharge valve cap (not illustrated) for restricting the flexural valve opening amount of the first discharge valve is caused to overlap the first discharge valve and is fixed together with the first discharge valve by riveting. The first discharge hole 190S, the first discharge valve, and the first discharge valve cap form the first discharge valve unit of the lower end plate 160S.

As illustrated in FIG. 1, an upper end plate cover 170T is disposed on the top side of the upper end plate 160T, and an upper muffler chamber 180T is formed between the upper end plate cover 170T and the upper end plate 160T. A second discharge hole 190T (refer to FIG. 2) which causes the second compression chamber 133T of the second cylinder 121T to communicate with the upper muffler chamber 180T is provided in the vicinity of the second vane 127T of the upper end plate 160T. A reed valve type second discharge valve (not illustrated) which prevents the backflowing of the compressed refrigerant is disposed on the second discharge hole 190T. A second discharge valve cap (not illustrated) for restricting the flexural valve opening amount of the second discharge valve is caused to overlap the second discharge valve and is fixed together with the second discharge valve by riveting. The upper muffler chamber 180T reduces the pressure pulsation of the discharged refrigerant. The second discharge hole 190T, the second discharge valve, and the second discharge valve cap form the second discharge valve unit of the upper end plate 160T.

The lower end plate cover 170S, the lower end plate 160S, the first cylinder 121S, and the intermediate partition plate 140 are fastened to the second cylinder 121T using a plurality of penetrating bolts 175 which are inserted through from the bottom side and are screwed into female screws which are provided in the second cylinder 121T. The upper end plate cover 170T and the upper end plate 160T are fastened to the second cylinder 121T using a penetrating bolt 174 which is inserted through from the top side and is screwed into a female screw which is provided in the second cylinder 121T. The lower end plate cover 170S, the lower end plate 160S, the first cylinder 121S, the intermediate partition plate 140, the second cylinder 121T, the upper end plate 160T, and the upper end plate cover 170T which are integrally fastened by the plurality of penetrating bolts 174 and 175 and the like form the compressing unit 12. In the compressing unit 12, the outer circumferential portion of the upper end plate 160T is joined to the body unit 10A of the compressor housing 10 by arc weld portions 163A, and the compressing unit 12 is fixed to the compressor housing 10. Description will be given later of the dimensional relationship between the upper end plate 160T and the body unit 10A.

The low-pressure refrigerant of the refrigerant circuit is guided to the first compressing unit 12S via the accumulator (not illustrated) and the first inlet hole 135S (refer to FIG. 2) of the first cylinder 121S. The low-pressure refrigerant of the refrigerant circuit is guided to the second compressing unit 12T via the accumulator (not illustrated) and the second inlet hole 135T (refer to FIG. 2) of the second cylinder 121T. In other words, the first inlet hole 135S and the second inlet hole 135T are connected in parallel to an evaporator of the refrigerant circuit.

A discharge pipe 107 which serves as the discharging unit which is connected to the refrigerant circuit and discharges the high-pressure refrigerant to a condenser side of the refrigerant circuit is connected to the top of the compressor housing 10. In other words, the first discharge hole 190S and the second outlet 190T are connected to the condenser of the refrigerant circuit.

The lubricant oil is filled in the inside of the compressor housing 10 to approximately the height of the second cylinder 121T in the axial direction. By the action of the pump impeller (not illustrated) which is inserted into the bottom portion of the rotation shaft 15, lubricant oil is sucked up from an oil feeding pipe 16 which is attached to the bottom end portion of the rotation shaft 15, circulates in the compressing unit 12, performs the lubrication of the sliding components (the first annular piston 125S and the second annular piston 125T), and seals the minute gaps of the compressing unit 12.

Characteristic Configuration of Rotary Compressor

Figure 3:
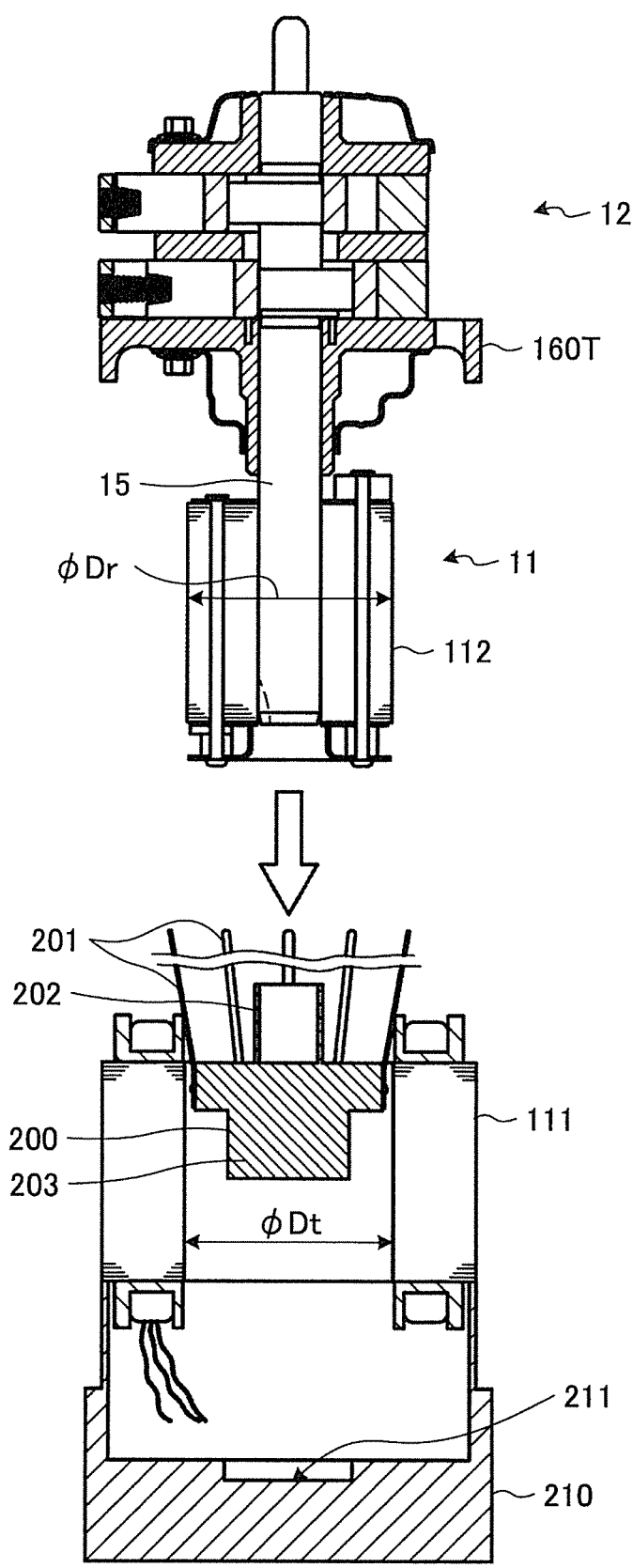
FIG. 3 is a vertical sectional view illustrating a state before the assembly of a stator and a rotor of the rotary compressor of the example.
Figure 4:
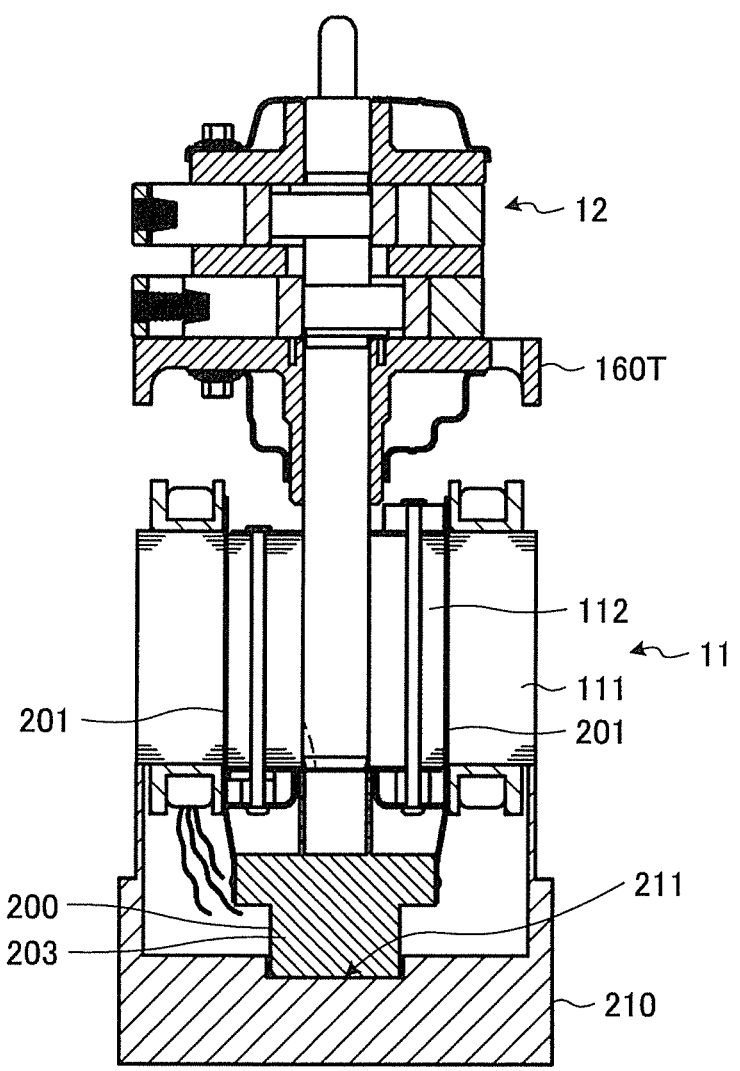
FIG. 4 is a vertical sectional view illustrating a state after the assembly of the stator and the rotor of the rotary compressor of the example.
Figure 5:
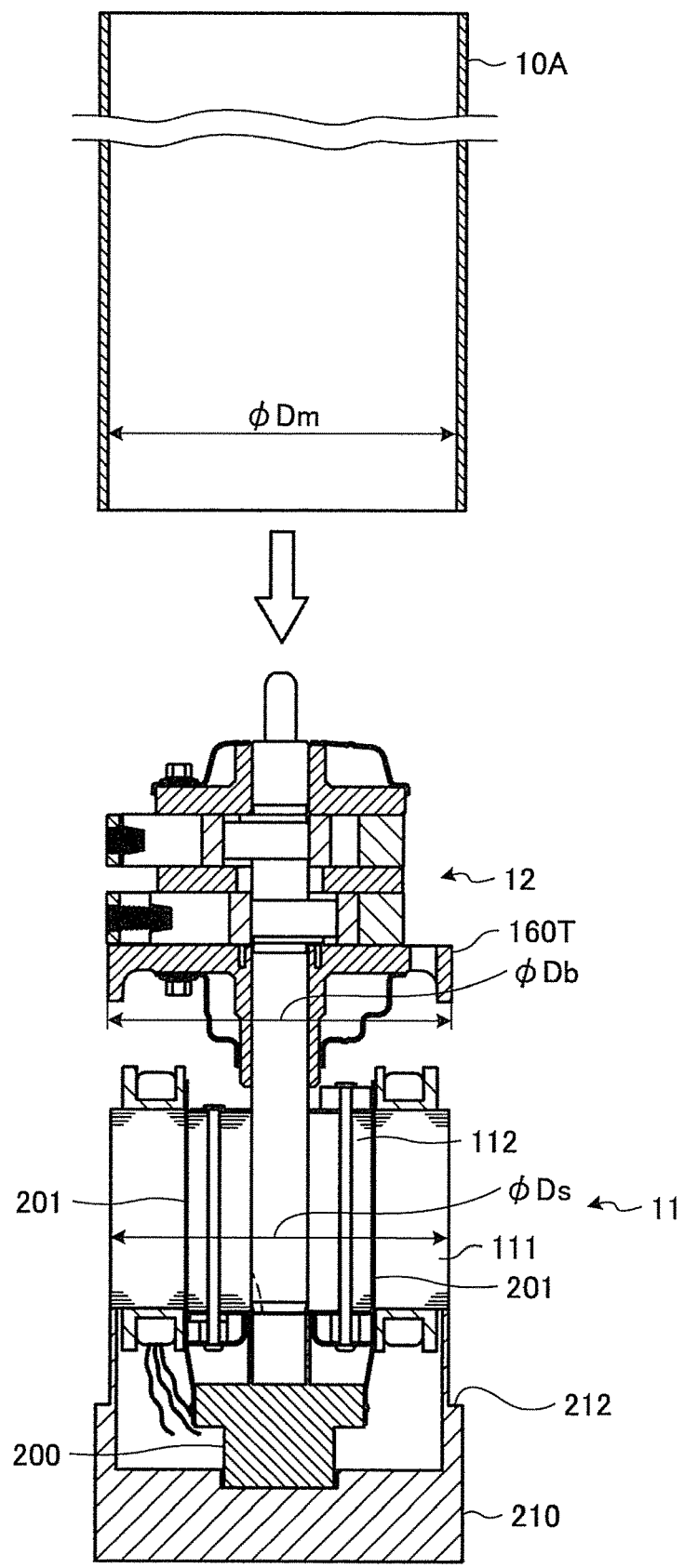
FIG. 5 is a vertical sectional view illustrating a state before the fitting of the compressing unit and the stator of the rotary compressor of the example and a body unit of a compressor housing.
Figure 6:
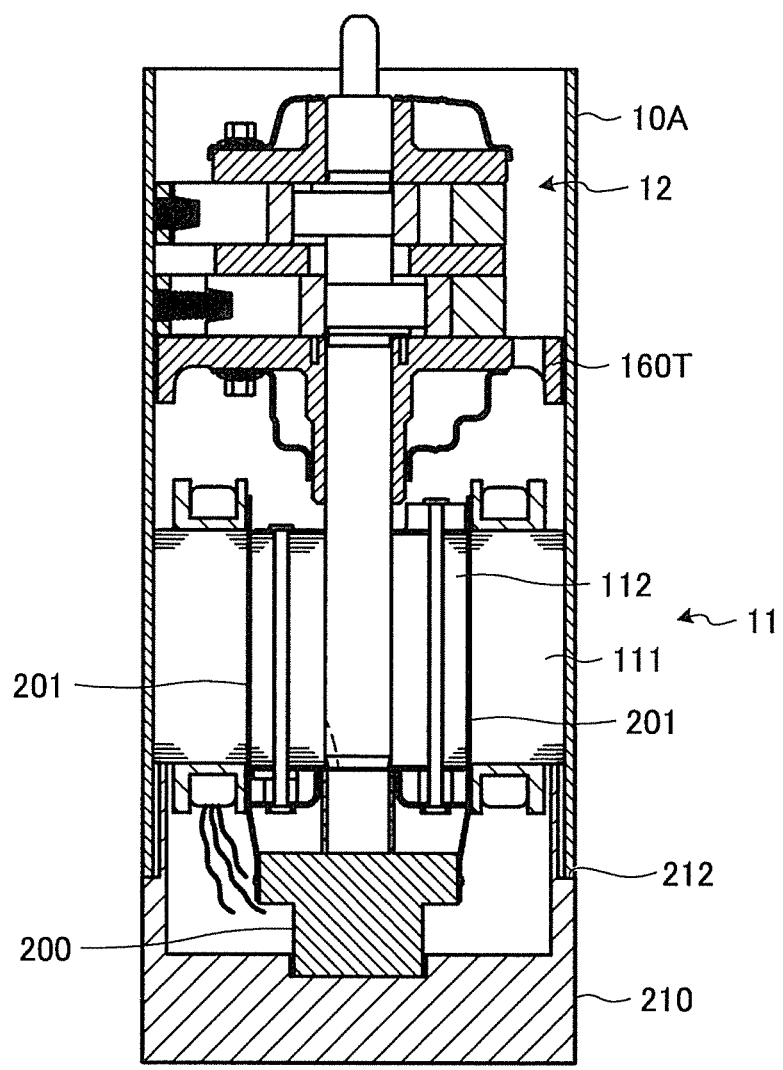
FIG. 6 is a vertical sectional view illustrating a state after the fitting of the compressing unit and the stator of the rotary compressor of the example and the body unit of the compressor housing.
Figure 7:
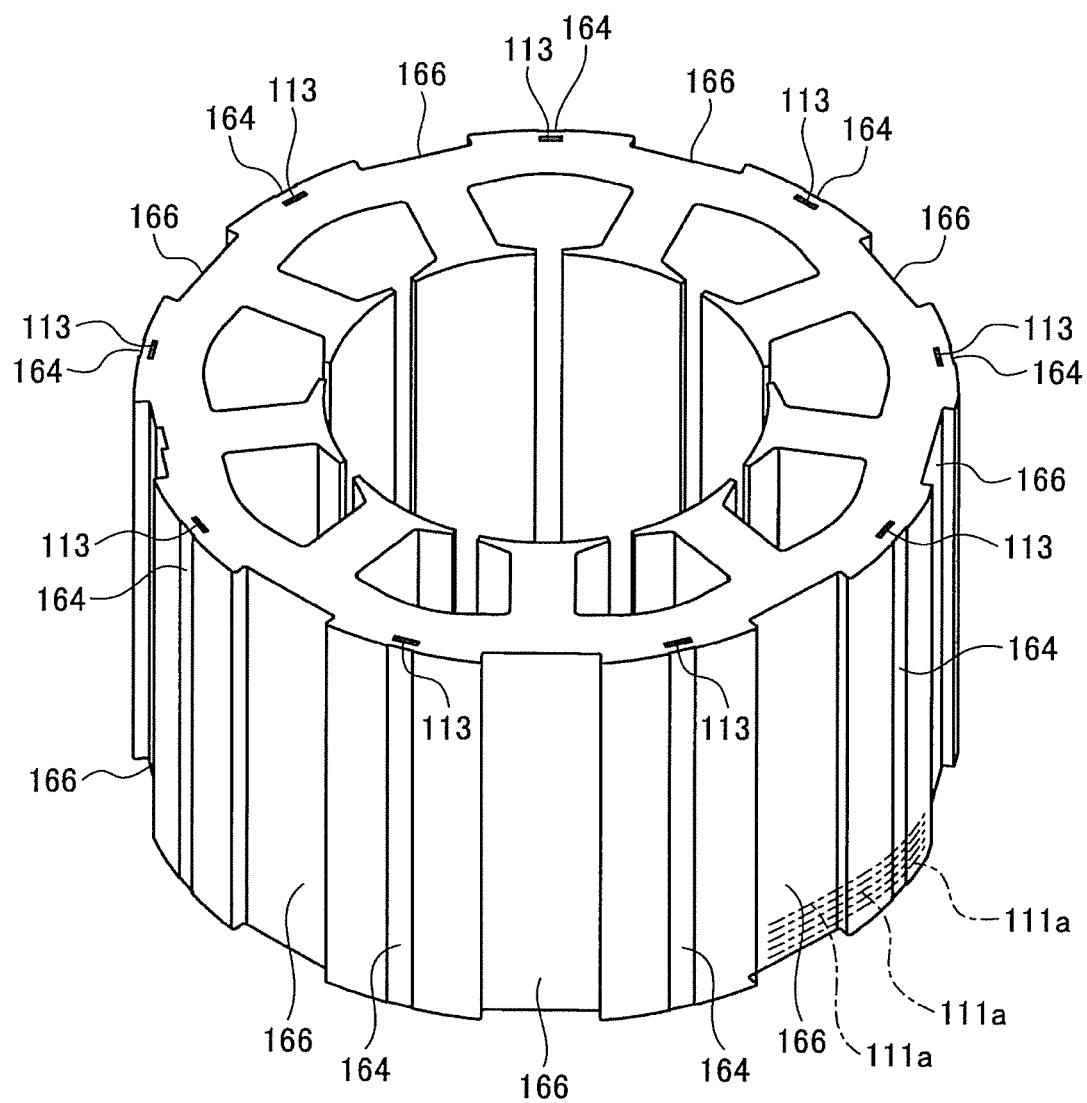
FIG. 7 is a perspective view illustrating the main parts of the stator of the rotary compressor of the example.
Figure 8:
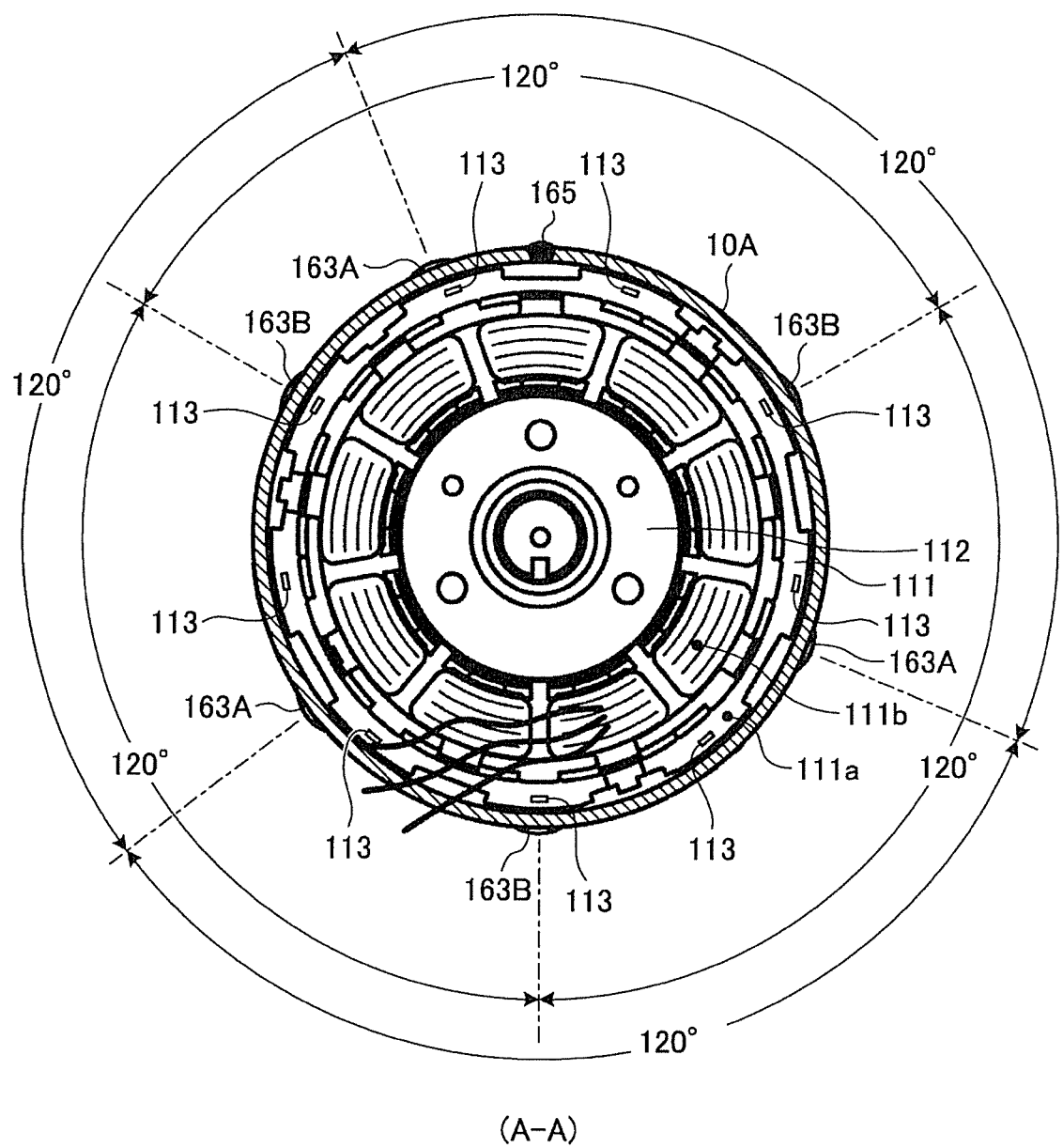
FIG. 8 is a horizontal sectional view taken along line A-A of FIG. 1 illustrating arc weld portions between the compressor housing and the stator of the rotary compressor of the example.

Next, description will be given of the characteristic configuration of the rotary compressor 1 of the example, with reference to FIGS. 3 to 8. FIG. 3 is a vertical sectional view illustrating a state before the assembly of the stator 111 and the rotor 112 of the rotary compressor 1 of the example. FIG. 4 is a vertical sectional view illustrating a state after the assembly of the stator 111 and the rotor 112 of the rotary compressor 1 of the example. FIG. 5 is a vertical sectional view illustrating a state before the fitting of the compressing unit 12 and the stator 111 of the rotary compressor 1 of the example and the body unit 10A of the compressor housing 10. FIG. 6 is a vertical sectional view illustrating a state after the fitting of the compressing unit 12 and the stator 111 of the rotary compressor 1 of the example and the body unit 10A of the compressor housing 10. FIG. 7 is a perspective view illustrating the main parts of the stator 111 of the rotary compressor 1 of the example. FIG. 8 is a horizontal sectional view taken along line A-A of FIG. 1 illustrating the arc weld portions between the compressor housing 10 and the stator 111 of the rotary compressor 1 of the example.

As illustrated in FIG. 3, an outer diameter φDr of the rotor 112 of the motor 11 is formed smaller than an inner diameter φDt of the stator 111, and a gap is secured between the outer circumferential surface of the rotor 112 and the inner circumferential surface of the stator 111. A thickness of a shim 201 of a gap gauge 200 which centers the rotor 112 and the stator 111 is thinner than the gap between the outer circumferential surface of the rotor 112 and the inner circumferential surface of the stator 111.

As illustrated in FIG. 5, an outer diameter φDs of the stator 111 of the motor 11 is larger than an outer diameter φDb of the upper endplate 160T of the compressing unit 12 (φDs>φDb). An inner diameter φDm of the body unit 10A of the compressor housing 10 is approximately equal to the outer diameter φDs of the stator 111 (φDm=φDs).

As illustrated in FIG. 7, the stator 111 includes steel plates 111a which serve as a plurality of metal plates which are stacked in the axial direction of the rotation shaft 15. The steel plates 111a are formed in a ring shape, and, as illustrated in FIG. 8, on the inner circumferential portion, a stator coil 111b is wound around a winding unit.

As illustrated in FIGS. 7 and 8, in an intra-surface direction of the plurality of steel plates 111a, a plurality of caulked joint portions 113 by which the adjacent steel plates 111a are joined to each other in the laminating direction are provided to be deformed in the thickness direction of the steel plates 111a. The caulked joint portions 113 are formed in a depressed shape which expand from one surface to the other surface in the thickness direction of the steel plates 111a. As viewed from the stacking direction (the axial direction of the stator 111) of the steel plates 111a, the caulked joint portions 113 are formed as rectangular depressions, and are positioned in the vicinity of the outer circumferential portion of the steel plates 111a. The plurality of caulked joint portions 113 are disposed along the outer circumferential portion of the stator 111 at a predetermined interval.

On the outer circumferential portion of the stator 111, that is, on the outer circumferential portion of the steel plates 111a, a plurality of concave portions 164 are provided with a predetermined gap to the inner circumferential portion of the compressor housing 10 in a state in which the stator 111 is fitted into the compressor housing 10. The plurality of concave portions 164 are disposed along the circumferential direction of the outer circumferential portion of the stator 111 at a predetermined interval. The plurality of concave portions 164 are formed across the stator 111 in an axial direction of the stator 111. In the example, the nine concave portions 164 are disposed in the circumferential direction of the stator 111 at an equal interval.

The concave portions 164 are formed in positions corresponding to the caulked joint portions 113 in the radial direction of the stator 111, and are provided as caulking release portions for permitting a deformation amount in the radial direction of the steel plate 111a, that is, for releasing the deformation of the steel plates 111a when the caulked joint portions 113 are plastically deformed. In the present example, the concave portions 164 which function as caulking release portions are also used as the concave portions 164 which join the compressor housing 10 during the arc welding. Although the cross sectional shape of the concave portions 164 is formed to be rectangular as viewed from the axial direction of the stator 111, the shape is not limited.

Since the concave portions 164 are formed at the same time as the external shape machining of the steel plates 111a by press working (stamping) in the manufacturing process of the steel plates 111a, it is possible to form the concave portions 164 on the outer circumferential portion of the steel plates 111a without setting a separate machining step. Therefore, the machining costs are not increased by the stator 111 including the concave portions 164. Since the concave portions 164 are formed by press working, inconsistency in the machining accuracy is suppressed. The formation of the concave portions 164 to a depth d less than or equal to 0.3 mm in relation to the radial direction of the stator 111 will be described later.

A plurality of oil grooves 166 which serve as flow channels of the lubricant oil are formed across the stator 111 in the axial direction in the outer circumferential portion of the stator 111. The plurality of oil grooves 166 are disposed along the circumferential direction of the outer circumferential portion of the stator 111 at a predetermined interval, and are disposed between the concave portions 164 in the circumferential direction.

As illustrated in FIG. 8, the body unit 10A is joined by winding steel plates in a cylindrical shape and butt welding the end portions to each other, and is formed in a cylindrical shape. Therefore, the dimensional precision of the inner diameter φDm and the circularity of the body unit 10A of the compressor housing 10 are low in comparison to a case in which the body unit 10A is formed using deep drawing or machining (a butt weld portion 165 is illustrated in FIG. 8).

Here, description will be given of a method of fixing the motor 11 and the compressing unit 12 which are connected by the rotation shaft 15 inside the body unit 10A of the compressor housing 10. As illustrated in FIGS. 3 and 4, when assembling the motor 11, the stator 111 is placed on the top end portion of a circular assembly jig 210 which includes a circular concave portion 211 in the bottom, and the gap gauge 200 onto the outer circumferential portion of which the plurality of shims 201 are attached is set on the top portion of the stator 111.

The compressing unit 12 in which the rotor 112 is fixed to the rotation shaft 15 is lowered with the rotor 112 on the bottom side, and the end portion of the rotation shaft 15 is caused to come into contact with an upper convex portion 202 of the gap gauge 200. If the compressing unit 12 is further lowered, the rotor 112 is guided by the shim 201 of the gap gauge 200, is inserted into the stator 111, and pushes the gap gauge 200 downward. As illustrated in FIG. 4, if a lower convex portion 203 of the gap gauge 200 is fitted into the concave portion 211 of the assembly jig 210, the rotor 112 is fully inserted into the stator 111, is centered by the shim 201, and the motor 11 is assembled.

Next, as illustrated in FIGS. 5 and 6, the body unit 10A of the compressor housing 10 is fitted onto the upper end plate 160T of the compressing unit 12 and the stator 111 of the motor 11 in a state in which the motor 11 and the compressing unit 12 are placed on the assembly jig 210. For the fitting of the body unit 10A to the upper end plate 160T, a lighter press fitting or a lighter shrink filling is used in comparison with general press fitting or shrink fitting.

In the present example, the inner diameter ϕDm of the body unit 10A of the compressor housing 10 and the outer diameter ϕDs of the stator 111 are formed to be substantially the same, and the stator 111 is fitted into the body unit 10A in a transition fit state. Here, transition fitting refers to conflicting fitting conditions in which the minimum allowed dimension of the outer diameter ϕDs of the stator 111 is smaller than the maximum allowed dimension of the inner diameter ϕDm of the compressor housing 10, and the maximum allowed dimension of the outer diameter ϕDs of the stator 111 is smaller than the minimum allowed dimension of the inner diameter ϕDm of the compressor housing 10. Therefore, generally, transition fitting includes cases in which a gap is formed between the inner circumferential surface of the compressor housing 10 and the outer circumferential surface of the stator 111, interference arises, or the like, and in actuality, as described above, since inconsistency arises in the circularity of the body unit 10A of the cylindrical compressor housing 10, a predetermined interference arises between the inner circumferential portion of the compressor housing 10 and the outer circumferential portion of the stator 111, and the compressor housing 10 is fitted to the stator 111.

In the example, transition fitting indicates a state in which the inner circumferential surface of the compressor housing 10 and the outer circumferential surface of the stator 111 are fixed while they have little interference in comparison to that of an interference fit, and the stress applied to the stator 111 in the radial direction is comparatively little. In other words, in the example, transition fitting indicates a state in which the stator 111 is fitted into the compressor housing 10 different from clearance fit, and indicates a fitting state which has a smaller predetermined interference than that of an interference fit. In order to perform fixing in the transition fitting state, specifically, as illustrated in FIG. 5, light shrink fit is performed by assembling the compressor housing 10 which is heated to cause the diameter to expand with the stator 111. By performing the light shrink fitting, a fitting state of a degree at which the stator 111 which is fitted into the compressor housing 10 does not fall out from inside the compressor housing 10 under the weight of the stator 111 is achieved.

As illustrated in FIG. 6, the body unit 10A is lowered until the bottom end of the body unit 10A comes into contact with a step portion 212 of the assembly jig 210, and the fitting work is ended. In this state, the stator 111 and the rotor 112 are fixed in a state in which a gap is not generated between the inner circumferential surface of the body unit 10A and the outer circumferential surface of the stator 111 except for at the positions of the concave portions 164 of the stator 111, and the stator 111 and the rotor 112 are in a centered state. Since the upper end plate 160T of the compressing unit 12 is also fixed to the body unit 10A using light shrink fitting, it is possible to easily position the center axis of the compressing unit 12 and the center axis of the motor 11 using the inner diameter of the body unit 10A as a reference. Therefore, it is possible to assemble the rotary compressor 1 so as to secure the operational reliability of the rotary compressor 1.

Joining State of Compressing Unit and Motor and Compressor Housing

Figure 9:
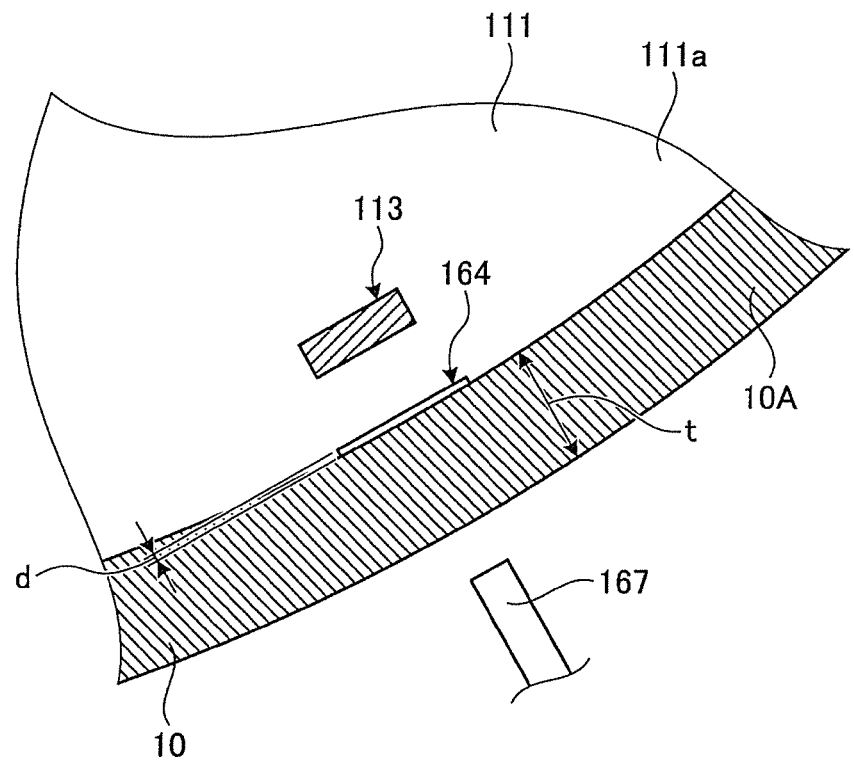
FIG. 9 is a horizontal sectional view illustrating an enlarged state before the welding between the compressor housing and the stator of the rotary compressor of the example.
Figure 10:
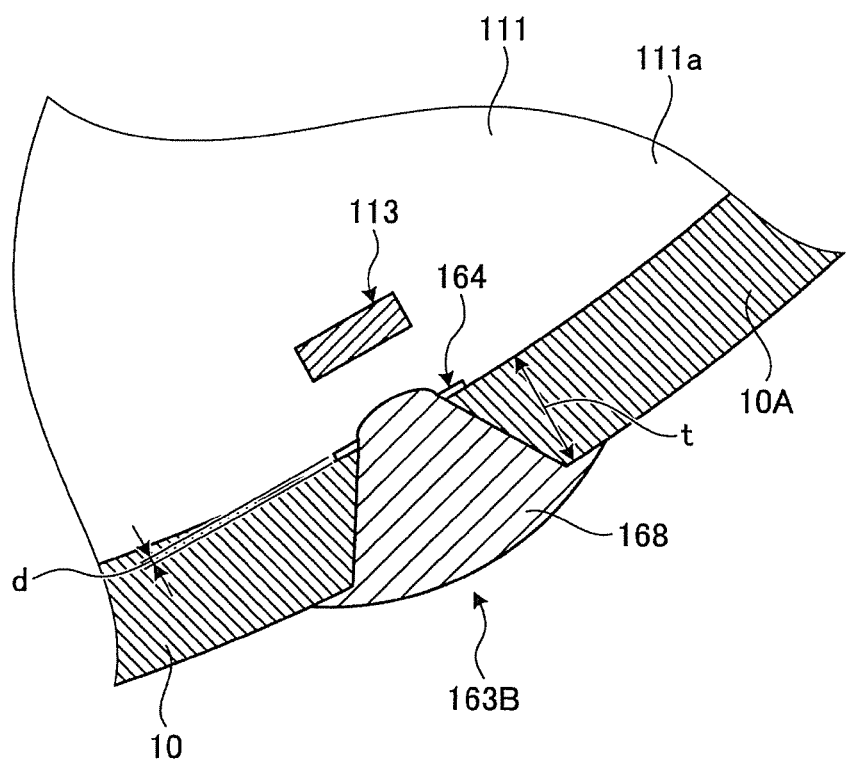
FIG. 10 is a horizontal sectional view illustrating an enlarged state after the welding between the compressor housing and the stator of the rotary compressor of the example.
Figure 11:
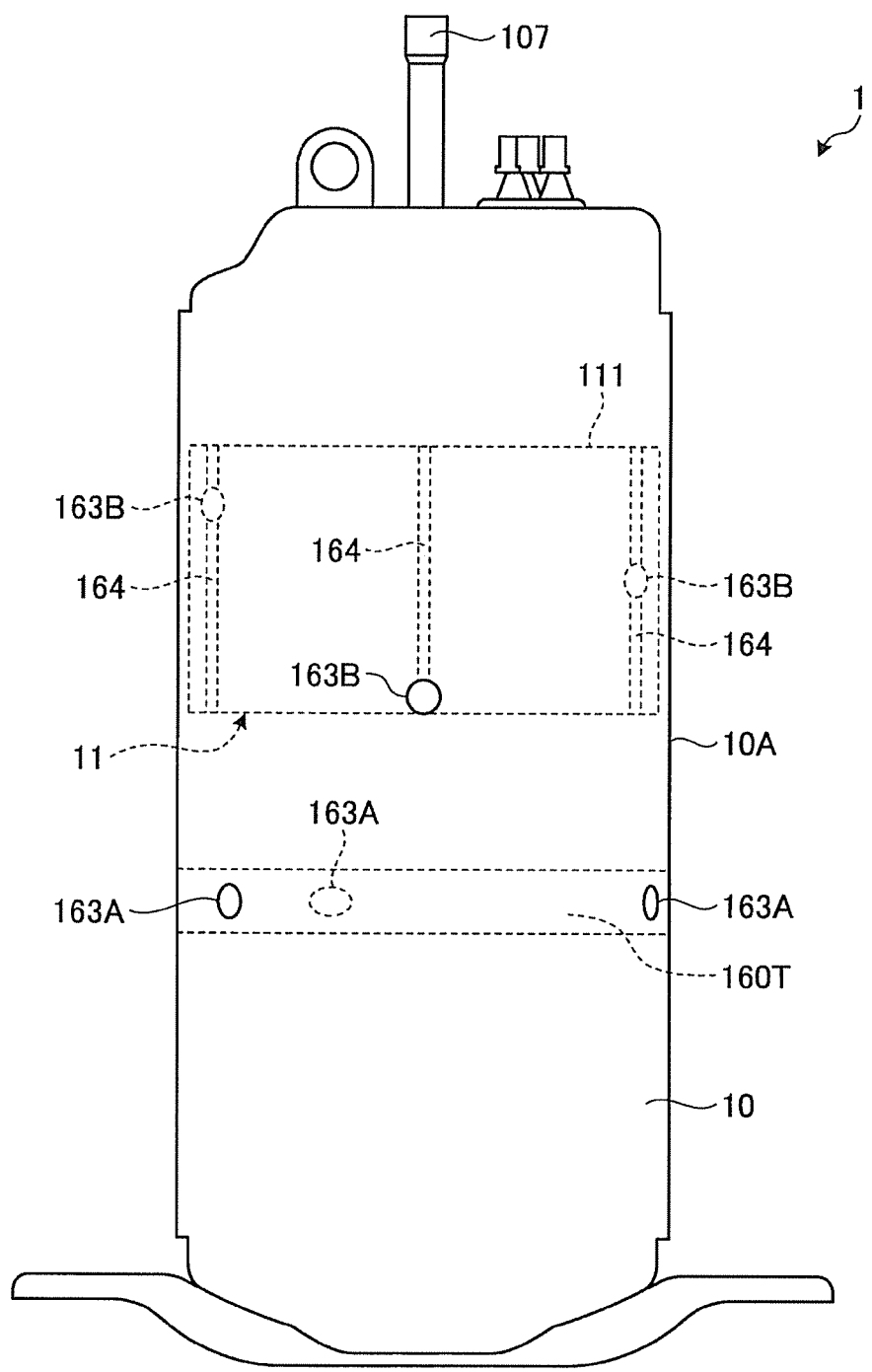
FIG. 11 is a side surface view illustrating the position of the arc weld portions between the compressor housing and the stator of the rotary compressor of the example.

Next, description will be given of the joining state of the upper end plate 160T of the compressing unit 12 and the stator 111 of the motor 11 in relation to the body unit 10A of the compressor housing 10, with reference to FIGS. 8 to 11. FIG. 9 is a horizontal sectional view illustrating an enlarged state before the welding between the compressor housing 10 and the stator 111 of the rotary compressor 1 of the example. FIG. 10 is a horizontal sectional view illustrating an enlarged state after the welding between the compressor housing 10 and the stator 111 of the rotary compressor 1 of the example. FIG. 11 is a side surface view illustrating the position of the arc weld portions between the compressor housing 10 and the stator 111 of the rotary compressor 1 of the example.

As illustrated in FIG. 8, the arc weld portions 163A are provided on the body unit 10A in three locations which are separated from each other in the circumferential direction of the upper end plate 160T by a center angle of 120° in positions at which the outer circumferential portion of the upper end plate 160T is fitted. A plurality of arc weld portions 163B are provided on the body unit 10A in positions of the outer circumferential portion corresponding to the concave portions 164 of the stator 111.

As illustrated in FIG. 11, the arc weld portions 163B are provided on the body unit 10A in three locations which are separated from each other in the circumferential direction of the stator 111 by a center angle of 120°, the three locations being a position in the vicinity of the top end surface of the compressing unit 12 side in the axial direction of the outer circumferential portion of the stator 111, a position in the vicinity of the bottom surface side of the opposite side from the compressing unit 12, and a center position in the axial direction of the outer circumferential portion of the stator 111.

The arc weld portion 163B in the vicinity of the top end surface is formed in a position approximately 12 mm from the top end surface of the stator 111 in the axial direction of the stator 111. Similarly, the arc weld portion 163B in the vicinity of the bottom end surface is formed in a position approximately 8 mm from the bottom end surface of the stator 111 in the axial direction of the stator 111. The steel plates 111a in the space from the arc weld portion 163B in the vicinity of the bottom end surface to the bottom end surface are fixed by only caulking and transition fitting. Therefore, it is preferable for the arc weld portion 163B in the vicinity of the bottom end surface to be close to the bottom end surface of the stator 111 in order to increase the stability of the fixing state of the steel plates 111a. The distance of the arc weld portion 163B of the top end surface side from the end surface of the stator 111 is rendered great in comparison to that of the arc weld portion 163B of the bottom end surface side in order to increase, as much as possible, the number of steel plates 111a which are supported by the arc weld portion 163B of the top end surface side.

The number of the arc weld portions 163A which join the body unit 10A of the compressor housing 10 to the upper end plate 160T, and the number of the arc weld portions 163B which join the body unit 10A of the compressor housing 10 to the stator 111 may be greater than or equal to three, as necessary. For example, six of the arc weld portions 163B may be provided for each of the upper end plate 160T and the stator 111.

A welding wire 167 (FIG. 9) is caused to be adjacent to the outer circumferential portion of the body unit 10A, the body unit 10A is welded to the upper end plate 160T first by arc welding, and next, the body unit 10A is welded to the stator 111. Conversely, the body unit 10A may be welded to the upper end plate 160T after welding the body unit 10A to the stator 111. The three arc weld portions 163B which join the body unit 10A to the stator 111 are performed in order along the circumferential direction of the body unit 10A, for example; however, the welding order is not limited, and the welding may be performed in any order. During the arc welding, the welding positions corresponding to the concave portions 164 of the stator 111 are determined based on the relative positions of the compressor housing 10 in relation to the upper inlet pipe 134T, the lower inlet pipe 134S, the discharge pipe 107, and the like.

The arc weld portions 163B in the example are formed by causing an electrode (not illustrated) to come into contact with the end surface of the body unit 10A of the compressor housing 10, and as illustrated in FIG. 9, causing the tip of the welding wire 167 to come into contact with the outer circumferential portion of the body unit 10A corresponding to the concave portions 164 of the stator 111, and performing the arc welding. As illustrated in FIG. 10, the arc weld portions 163B which are formed of conical welding beads 168, the tips of which extend toward the concave portions 164 of the stator 111, by joining the body unit 10A of the compressor housing 10 to the concave portions 164 of the outer circumferential portion of the stator 111. The concave portions 164 of the stator 111 are joined by the welding beads 168 during the arc welding, and are capable of withstanding the pressure of the compressed refrigerant. After the arc welding, the gap gauge 200 is removed from the motor 11.

In a case in which portions where the inner circumferential surface of the body unit 10A and the outer circumferential surface of the stator 111 are in contact with each other without gaps are welded, there is a possibility that the weld portions of the body unit 10A are not suitably heated because the heat during the welding is easily transferred through the body unit 10A to the stator 111 side, and therefore the heat escapes to the stator 111 side. Meanwhile, in the present example, due to the outer circumferential portion of the stator 111 including the concave portions 164, since the gap which is formed between the outer circumferential surface of the stator 111 and the body unit 10A serves as a thermally insulating portion, and the heat during the welding escaping to the stator 111 is suppressed, the heating is performed suitably, and the welding is performed reliably.

For example, in a case in which a thickness t of the body unit 10A is 2.0 mm≤t≤4.0 mm, in a case in which the size of the gap between the inner circumferential surface of the body unit 10A and the outer circumferential surface of the stator 111, that is, a depth d of the concave portions 164 is minute so as to satisfy the relationship 0<d≤0.3 mm, the body unit 10A melts easily due to the thermal insulating action of the minute gap (air layer) between the body unit 10A and the stator 111, and the depth d of the concave portions 164 is minute, and thus, it is possible to cause the molten metal to spread suitably inside the concave portions 164 of the stator 111. Therefore, due to the welding beads 168 straddling the space between the inner circumferential surface of the body unit 10A and the inside of the concave portions 164 of the stator 111 without gaps, the arc weld portions 163B are formed suitably. In a case in which the depth d of the concave portions 164 exceeds 0.3 mm, since it becomes difficult for the molten metal to sufficiently reach the inside of the concave portions 164, and the tips of the welding beads 168 may not suitably join with the insides of the concave portions 164, the depth d exceeding 0.3 mm is undesirable.

In the present example, in a case in which, in the weld portions, the thickness t in relation to the radial direction of the cylindrical stator 111 is approximately 10 mm, the thickness t in the radial direction of the body unit 10A is from 2.0 mm to 4.0 mm inclusive, and the depth d of the concave portions 164 is 0.3 mm, when viewed from the outer circumferential portion of the body unit 10A, the welding marks of the arc weld portions 163B have a diameter of approximately 10 mm.

In a case in which the thickness t of the body unit 10A is less than 2.0 mm, it is difficult to sufficiently secure the strength of the body unit 10A. In a case in which the thickness t of the body unit 10A exceeds 4.0 mm, it is difficult to sufficiently heat the body unit 10A during the welding. It is preferable for the depth d of the concave portions 164 to be less than or equal to 0.3 mm from the perspective of smoothly forming the arc weld portions 163B in which the tips of the welding beads 168 are sufficiently joined to the inside of the concave portions 164.

In the present example, by using the concave portions 164 of the stator 111 without machining through holes or blind holes in the weld portions of the body unit 10A in advance, it is possible to suitably perform the arc welding between the body unit 10A and the stator 111. However, in a case in which the thickness t of the body unit 10A exceeds 4.0 mm, for example, by machining step portions in relation to the radial direction in the outer circumferential portion of the body unit 10A as necessary, adjustment may be performed to render the thickness of the portions corresponding to the concave portions 164 less than or equal to 4.0 mm.

In the example, the body unit 10A and the upper end plate 160T are arc welded first, then the motor 11 which is centered by the compressing unit 12 and the gap gauge 200 is positioned and fixed inside the body unit 10A. Next, in a state in which the motor 11 is centered in relation to the body unit 10A, and in a transition fit state in which the compressing force in the radial direction from the body unit 10A is small in comparison to in an interference fit, the stator 111 is directly welded to the body unit 10A. Therefore, since the compressing force which acts on the stator 111 from the body unit 10A becomes smaller, the efficiency of the motor 11 is increased without compressive strain occurring in the stator 111, and without the magnetizing characteristics of the stator 111 being degraded and iron loss increasing.

The body unit 10A of the compressor housing 10 and the stator 111 are arc welded and fixed by the three arc weld portions 163B which are spaced at a predetermined interval in relation to the axial direction and the circumferential direction of the stator 111. Therefore, even when the rotary compressor 1 receives a shock such as falling, in the outer circumferential portion of the stator 111 in which the stacked plurality of steel plates 111a are joined by the caulked joint portions 113, the caulking state between each of the one end of the compressing unit 12 side, the other end of the opposite side from the compressing unit 12, and the center in the axial direction of the stator 111 being released and the steel plates 111a of the stator 111 separating is suppressed.

In the example, after the stator 111 is centered and attached inside the body unit 10A, in order to avoid spatter adhering to the positioning jig and the like during the arc welding, an attachment which is caused to fit the stator 111 inside the body unit 10A is removed from the assembly jig 210, and the body unit 10A is transported to a welding work position using a robot arm. In this manner, the welding is performed at the welding work position which is separated from the assembly jig 210, and in a case in which the fitting between the body unit 10A and the stator 111 is a clearance fit, there is a problem of the stator 111 separating from inside the body unit 10A, and by using the transition fit, it becomes possible to smoothly transport the body unit 10A in a state in which the stator 111 is held inside the body unit 10A, and it is possible to avoid the detachment of the stator 111 from the body unit 10A.

As illustrated in FIG. 8, by shifting and disposing (phase shifting) the positions of the three arc weld portions 163A of the upper end plate 160T in the circumferential direction, and the positions of the three arc welds 163B of the stator 111 in the circumferential direction in relation to the circumferential direction of the body unit 10A, the arc weld portions 163A and 163B are caused not to line up on a straight line in the axial direction of the body unit 10A. Therefore, in the body unit 10A, since a long distance is secured between the arc weld portions 163A and 163B at which the strength is comparatively weak, the weakening of the strength of the body unit 10A is suppressed. With regard to the arc weld portions 163B which join the inner circumferential surface of the body unit 10A to the concave portions 164 of the stator 111, the maximum gap between the inner circumferential surface of the body unit 10A and the concave portions 164 of the outer circumferential surface of the stator 111 in the radial direction of the body unit 10A, that is the depth d of the concave portions 164 is 0.30 mm. Accordingly, the inner circumferential surface of the body unit 10A and the concave portions 164 of the outer circumferential surface of the stator 111 are smoothly welded, and sputter flying to encroach on the inner portion or the like of the stator 111 during the welding is suppressed.

As illustrated in FIG. 1, after welding and fixing the compressing unit 12 and the motor 11 to the body unit 10A, the assembly of the rotary compressor 1 is completed by welding along the entire circumference of a bottom 10C and a top 10B on both ends of the body unit 10A. It is possible to apply the present disclosure to a single cylinder system rotary compressor and a two-stage compression system rotary compressor.

Effects of Example

As described above, in the rotary compressor 1 of the example, the outer circumferential portion of the stator 111 includes the concave portions 164 and is fixed to the inner circumferential portion of the body unit 10A of the compressor housing 10 in a transition fit state. The body unit 10A of the compressor housing 10 includes the arc weld portions 163B which are joined to the concave portions 164 of the stator 111. Accordingly, in comparison to a case in which through holes or blind holes are machined in the outer circumferential portion of the compressor housing 10, it is possible to increase the reliability of the welding state of the arc weld portions 163B between the compressor housing 10 and the stator 111.

Specifically, due to the stator 111 including the concave portions 164, gaps are formed between the inner circumferential surface of the compressor housing 10 and the outer circumferential surface of the stator 111, and since the gaps act as thermally insulating spaces, the heat which is applied from the outer circumferential portion of the compressor housing 10 being transmitted to the stator 111 side and escaping is suppressed. Therefore, since the weld portions of the compressor housing 10 are suitably melted during the arc welding, and the tips of the welding beads 168 smoothly reach the insides of the concave portions 164, it is possible to suitably form the arc weld portions 163B.

According to the example, the stator 111 includes the concave portions 164, and due to the compressor housing 10 and the stator 111 being fixed in a transition fit state, during the handling in the assembly process of the rotary compressor 1, the separation of the compressor housing 10 and the stator 111 is avoided, and it is possible to increase the assembly workability.

In a case in which the compressor housing and the stator are fixed in an interference fit state, stress is applied in relation to the radial direction of the stator. According to the stress, in the rotary compressor, in a case in which compression strain arises in the stator of the motor which is disposed inside the compressor housing, there are problems in that the magnetizing characteristics of the stator are degraded, the iron loss increases, and the efficiency of the motor decreases. However, according to the example, due to the compressor housing 10 and the stator 111 being fixed in the transition fit (light shrink fit) state, and being joined by the arc weld portions 163B, stress caused by the compressor housing 10 being applied in the radial direction of the stator 111 is suppressed. Therefore, it is possible to suppress the decrease in the efficiency of the motor 11.

The rotary compressor 1 of the example also uses the concave portions 164, which are used as caulking release portions during the external machining of the steel plates 111a of the stator 111, during the welding, and thus, it is not necessary to separately machine the concave portions 164 in the stator 111. Therefore, machining costs for machining, in advance, through holes or blind holes in the outer circumferential portion of the compressor housing as in the rotary compressor of the related art described above become unnecessary. Additionally, in the example, since the concave portions 164 are formed by press working the steel plates 111a one sheet at a time and the steel plates 111a are stacked to a predetermined stacking thickness, it is possible to avoid inconsistency arising in the machining accuracy of the concave portions 164 in comparison to a case in which a drilling tool such as a drill for machining the through holes or the blind holes in the compressor housing is used. Accordingly, it is possible to further increase the stability of the welding state of the arc weld portions 163B between the compressor housing 10 and the stator 111. In the present example, by not machining through holes in the compressor housing 10, it is possible to avoid the sputter which is generated during the welding encroaching on the inner portion or the like of the stator 111.

In the example, the compressor housing 10 and the stator 111 are joined better by forming the arc weld portions 163B using arc welding (fusion welding), in comparison with spot welding (pressure welding). Accordingly, it is not necessary to interpose weld portions between the stator 111 and the compressor housing 10 using electrodes, and it is possible to increase the welding workability.

The depth d, in the radial direction of the stator 111, of the concave portions 164 of the stator 111 in the rotary compressor 1 of the example satisfies the relationship 0<d≤0.3 mm. Accordingly, since the concave portions 164 of the stator 111 and the compressor housing 10 are smoothly joined by the welding beads 168 by arc welding, it is possible to suitably form the arc weld portions 163B.

In the compressor housing 10 in the rotary compressor 1 of the example, the thickness t of portions to which the outer circumferential portion of the stator 111 is fixed in a transition fit state, that is, portions which are included in the arc weld portions 163B satisfies the relationship 2.0 mm≤t≤4.0 mm. Accordingly, since the concave portions 164 of the stator 111 and the compressor housing 10 are smoothly joined by the welding beads 168 by arc welding, it is possible to suitably form the arc weld portions 163B.

In a case in which the stator 111 which has a thickness greater than or equal to 10 mm in the radial direction and the compressor housing 10 which has a thickness of 2.0 mm to 4.0 mm are spot welded at the weld portions, it is necessary to interpose the stator 111 and the compressor housing 10 between the electrodes at the welding positions. However, in a case in which the shape of the stator 111 is changed in order to insert the electrodes since it is difficult to provide space for inserting the electrodes inside the stator 111, it becomes difficult to secure the performance of the motor 11. In a case in which the stator 111 and the compressor housing 10 of the thicknesses described above are spot welded, since the thickness is great, there is a problem in that a comparatively large power source is necessary for the spot welding. Therefore, it is difficult to join the stator 111 and the compressor housing 10 of the thicknesses described above using spot welding. Meanwhile, in the present example, in comparison with spot welding, by performing arc welding, the electrodes may be caused to come into contact with the end surface of the body unit 10A of the compressor housing 10, and it becomes possible to perform the welding using a power source of approximately 200 A. Accordingly, it is possible to appropriately weld the stator 111 to the compressor housing 10 using the arc weld portions 163B while securing the performance of the motor 11.

In the compressor housing 10 in the rotary compressor 1 of the example, the plurality of arc weld portions 163B are disposed in the circumferential direction of the compressor housing 10 at an equal interval, and the positions (height) in relation to the axial direction of the compressor housing 10 differ from each other. Accordingly, since the arc weld portions 163B being lined up on a straight line is suppressed, it is possible to suppress a decrease in the strength of the compressor housing 10 which comes with the formation of the arc weld portions 163B.

In the above, description is given of the examples; however, the examples are not limited by the previously-described content. The previously-described constituent elements include elements which may be easily anticipated by a person skilled in the art, elements which are essentially the same, and so-called elements of an equivalent scope. It is possible to combine the previously-described constituent elements, as appropriate. It is possible to perform at least one of various omissions, replacements, modifications, and any combination thereof of the constituent elements in a scope that does not depart from the gist of the examples.

What is claimed is:

1. A rotary compressor comprising:
   a cylindrical compressor housing which is provided with an inlet unit of a refrigerant and a discharging unit of the refrigerant;
   a compressing unit which is disposed inside the compressor housing and which includes a cylinder and a piston for compressing the refrigerant that is sucked in from an inlet portion;
   a rotation shaft which is provided with the piston of the compressing unit;
   a bearing unit which is fixed to an inner portion of the compressor housing and which supports one end side of the rotation shaft to rotate freely; and
   a motor which includes a cylindrical stator and a rotor that is provided on another end side of the rotation shaft and that rotates inside the stator, and which drives the compressing unit via the rotation shaft, wherein
   the stator includes metal plates stacked in an axial direction of the rotation shaft,
   the metal plates each have a portion deformed in a thickness direction of each metal plate as a caulked joint portion, and a concave portion at a periphery of each metal plate, a position of the concave portion corresponding to the caulked joint portion,
   adjacent metal plates of the metal plates are joined together by using caulked joint portions of the adjacent metal plates to stack the adjacent metal plates in the axial direction in order to form the stator,
   an outer circumferential portion of the stator includes an elongated concave portion and an oil groove for lubricant oil to flow in the axial direction, and is fixed to an inner circumferential portion of the compressor housing in a transition fit state, the elongated concave portion comprising the concave portion of each metal plate,
   a weld portion joins the elongated concave portion and the inner circumferential portion of the compressor housing together, and
   the elongated concave portion is smaller than the weld portion at a cross section perpendicular to the axial direction.

2. The rotary compressor according to claim 1, wherein the elongated concave portion is formed across the stator in the axial direction.

3. The rotary compressor according to claim 1, wherein a depth d of the elongated concave portion in the radial direction of the stator satisfies a relationship of 0<d≤0.3 mm.

4. The rotary compressor according to claim 3, wherein a thickness t of a portion of the compressor housing at which the weld portion is provided satisfies a relationship of 2.0 mm≤t≤4.0 mm.

5. The rotary compressor according to claim 1, wherein the concave portion of each metal plate includes a plurality of concave portions,
   the elongated concave portion of the stator includes a plurality of elongated concave portions which are provided at an interval in a circumferential direction of the stator and the plurality of elongated concave portions are provided across the stator in the axial direction, and
   the weld portion includes a plurality of spot-like shaped weld portions disposed at an equal interval in a circumferential direction of the compressor housing, and positions of the weld portions differ from each other in relation to the axial direction.

6. The rotary compressor according to claim 1, wherein a depth of the elongated concave portion is smaller than a thickness of the caulked joint portion in a radial direction of the stator.

7. A rotary compressor comprising:

a cylindrical compressor housing which is provided with an inlet unit of a refrigerant and a discharging unit of the refrigerant;

a compressing unit which is disposed inside the compressor housing and which includes a cylinder and a piston for compressing the refrigerant that is sucked in from an inlet portion;

a rotation shaft which is provided with the piston of the compressing unit;

a bearing unit which is fixed to an inner portion of the compressor housing and which supports one end side of the rotation shaft to rotate freely; and a motor which includes a cylindrical stator and a rotor that is provided on another end side of the rotation shaft and that rotates inside the stator, and which drives the compressing unit via the rotation shaft, wherein the stator includes metal plates stacked in an axial direction of the rotation shaft, the metal plates each have a portion deformed in a thickness direction of each metal plate as a caulked joint portion, and a concave portion at a periphery of each metal plate, a position of the concave portion corresponding to the caulked joint portion, adjacent metal plates of the metal plates are joined together by using caulked joint portions of the adjacent metal plates to stack the adjacent metal plate in the axial direction in order to form the stator, an outer circumferential portion of the stator includes an elongated concave portion and an oil groove for lubricant oil to flow in the axial direction, and is fixed to an inner circumferential portion of the compressor housing in a transition fit state, the elongated concave portion comprising the concave portion of each metal plate, a weld portion joins the elongated concave portion and the inner circumferential portion of the compressor housing together, and a depth of the elongated concave portion is smaller than a thickness of the caulked joint portion in a radial direction of the stator.

* * * * *